Patented May 8, 1951

2,552,451

UNITED STATES PATENT OFFICE 2,552,451

FRACTIONATION OF LOW MOLECULAR WEIGHT COMPONENT MIXTURES

John A. Patterson, Beverly, N. J., assignor to Standard Oil Development Company, a corporation of Delaware Application July 3, 1947, Serial No. 758,842

2 Claims. (Cl. 62—175.5)

This invention relates to the purification and separation of normally gaseous compounds from complex mixtures at subatmospheric temperatures and the novel use of an expansion device in such processing. It refers particularly to the fractionation of normally gaseous low molecular weight compounds such as hydrocarbon mixtures by fractional distillation and fractional condensation.

Low temperature fractionation has been extensively employed for the separation of oxygen, nitrogen and the other permanent gases from air. In this processing, the fractionation has been carried out more economically by distillation in the double tower, that is, two distillation zones at different pressures separated by a common heat transfer unit functioning as a condenser for the vapors in the high pressure zone and as a reboiler for the feed supplied to the upper lower pressure zone. This unit is also especially designed to be compact so as to minimize heat leakage. Further economies in processing have been achieved in the prior art by the use of expansion engines such as the Kapitza turbo-expander adapted to carry the refrigeration load and at the same time to perform useful work. Processing, however, in the double tower and with vapor operated expansion engines upon mixtures having a wider boiling range than that of air has generally not been considered advantageous because of having to operate with a temperature close to the critical temperature of a component or an excessive pressure in the system.

Figure 1:
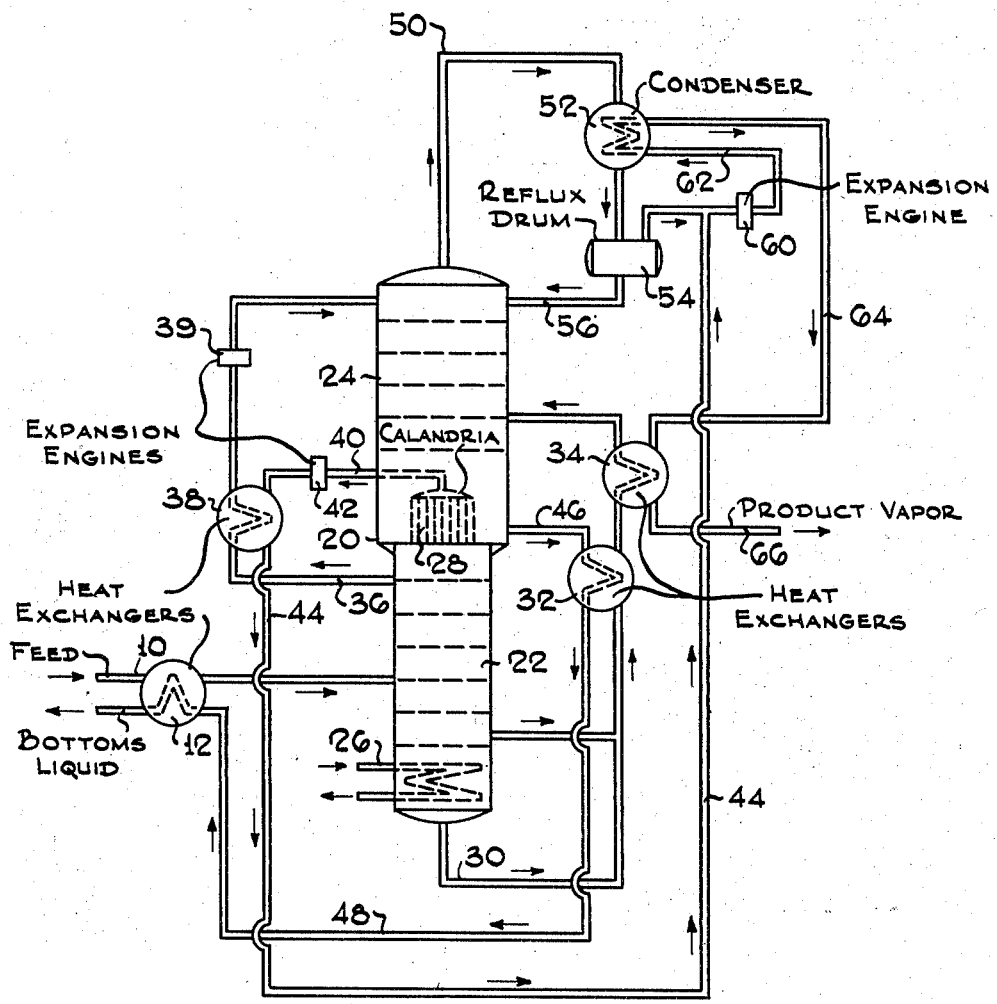
Figure 2:
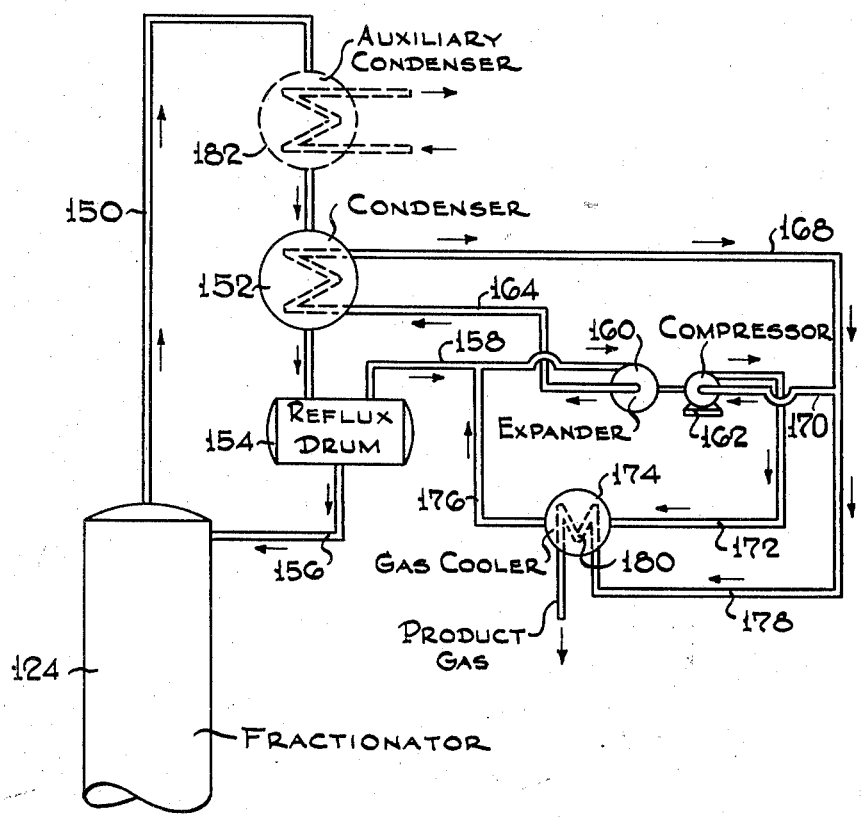

In the present invention, fractionation of mixtures of wide subatmospheric boiling ranges is effected in a plurality of stages under diminishing pressure as a result of the novel use of external refrigeration means. In the accompanying drawings, Figures 1 and 2, illustration of particular embodiments of the invention is presented, Figure 1 being a vertical sectional diagram of equipment with indicated flow of materials plan suitable for processing according to the invention, and Figure 2 presents a flow diagram for improved processing to obtain added reflux in the low pressure zone of the two-stage fractionation process shown in Figure 1.

The particular processing advantage of the use of external refrigeration means is achieved by the use of impulse turbines to remove heat energy from liquid streams with the minimum development therefrom of vapor and at the same time to perform useful work. The degree of fractionation is thus improved by this external refrigeration. The liquid phase impulse turbine is also of wide application such as in cascade refrigeration, that is, step-wise reduction in subatmospheric temperature by the use of several refrigeration cycles.

In the prior art use of expansion engines to liquefy normally gaseous mixtures such as air, vapor streams have been employed and in the more advantageous, the expander suction temperature is maintained at such a level that the expander discharge will just be at its saturation point or a degree above it. In the latter type expansion engines, if the suction is allowed to fall too low, liquid will be formed in the turbine and its thermo-dynamic efficiency will be impaired. After passing through a cooling device of this type, the mixture is preferably liquefied before entering one or other of the distillation zones of the double tower. In the double tower, the heat supply for the low pressure zone is supplied through the heat exchanger unit at the bottom by the condensation of the vapors at the top of the high pressure zone. Design of this heat exchanger unit is a problem when a static level has to be maintained in the reboiler section. Usually this disadvantage is overcome by raising the pressure on the high pressure or condensing side with the consequent increase in operating power cost due to added compression. In the present invention by the use of impulse turbines operated by liquid streams, many of such prior art disadvantages are overcome.

In the present invention, the mixture to be fractionated, such as a complex low molecular weight hydrocarbon mixture, is processed to particular advantage in a double tower by reason of employment of a turbine, preferably a liquid phase impulse turbine, performing useful work as a cooling means for one or more of the liquid intermediate and product streams. In this manner, particular restrictions as to a temperature and pressure are overcome, liquid phase conditions are easily maintainable as desired throughout the processing, and suitable processing with mixtures of very varied boiling ranges may be made. Also, the cost of refrigeration necessary to produce the low temperatures involved is minimized by utilizing the available work obtained by passage of the various streams through the expansion engines.

It is an object of the present invention to realize the maximum refrigeration obtainable from the streams undergoing low temperature fractionation. It is an object also of the invention to provide added refrigeration to systems for the fractionation of normally gaseous mixtures and to aid in the distillation and separation of the constituents of such mixtures. It is another object of the invention to adapt a turbine device having a high order of efficiency to the cooling of liquefied gaseous streams with the performance of external work. It is another object of the invention to make available a turbine mechanism for liquefied gases by the use of which a substantial amount of the energy associated with the liquid streams may be recovered. It is also an object to improve the thermodynamic efficiency of simple and cascade refrigeration systems by expanding high pressure liquid refrigerants through a turbine, preferably a liquid phase impulse turbine, instead of through a simple expansion valve as is commonly practiced.

The processing according to the invention is very suitably adapted for the separation of the constituents from such mixtures as flue gas, natural gas and those made available by the cracking of hydrocarbons such as propane. The processing involves the use of the conventional tower containing a plurality of distillation zones under diminishing pressure to which the feed as precooled liquid is supplied in the section of highest pressure. By distillation within this high pressure section, two fractions at least are obtained, namely, a condensate from the fractionated vapors and the liquid distillation residue: in some cases a vapor stream is also obtained. The fractionated condensate is obtained suitable in amount and quantity for furnishing the reflux to the lower pressure usually superimposed section. As a result of the condensation of the fractionated vapors in the high pressure section the reboiling of the bottoms liquid in the lower pressure section is effected. The design of this heat transfer unit between the zones and the pressure differential between the two zones ensure the maintenance of this condenser-reboiler relationship and thus minimizes the need for external condenser or cooling devices for the vapors produced in the high pressure section. The distillation residue or side stream from the high pressure section is supplied as the feed to the low pressure section. As in processing in the conventional double tower, the liquid reflux available from the high pressure section of the tower aids in the fractionation effected in the low pressure section.

In the purification of hydrocarbon mixtures where the spread in boiling point is relatively wide, it is difficult to produce adequate reflux by normal double tower operation. In the invention, use is made of the refrigerating effect produced when the condensed vaporous and liquefied gaseous streams are passed through expansion engines, preferably liquid phase impulse turbines, alone or in combination with other type expansion engines to produce additional cooling and additional reflux necessary for effective fractionation in the lower pressure section. Thus, according to the invention the feed gases, after suitable heat exchange, and, if considered necessary, refrigeration, are introduced mainly as a liquid into the high pressure section. A portion of the liquid is taken from the top plate of the high pressure section and supplied as the main reflux to the lower pressure section, usually after passing through an expansion engine. In addition also, non-condensibles such as hydrogen containing equilibrium quantities of the lighter hydrocarbons are withdrawn from the heat exchanger at the top of the high pressure section and passed through an expansion device, preferably a vapor turbo expander, to bring the pressure to that corresponding to that in the lower pressure section of the tower and then used as a coolant stock and subsequently combined with the overhead vapor material from the latter section for further expansion to atmospheric pressure. The liquid bottoms from the high pressure section, after suitable heat exchange, are introduced as feed into the lower pressure section.

The low pressure section of the double tower is the portion of the equipment in which the major fractionating occurs. The gaseous overhead product from the low pressure section may either consist of the desired hydrocarbon such as ethylene and lighter materials from cracked propane stock or else all materials lighter than the desired hydrocarbons. This overhead product is cooled by heat exchange with gas expanded in an expansion engine. The condensed material resulting from cooling the overhead product is then employed as aditional reflux for the fractionation in the lower pressure section. The non-condensible portion of the overhead from the lower pressure section is usually combined with the expanded gas from the high pressure section after initial expansion of the latter and introduced into a second expansion engine to produce additional refrigeration and to bring the effluent gases to about atmospheric pressure. Additional cooling and refrigeration are thereby obtained.

One improvement in processing according to the invention also involves expanding the gaseous distillate from the lower pressure section of the double tower through an engine to obtain a product at a lower temperature and pressure. The expansion engine is of the type performing useful external work and thus may be connected to a compressor. The compressor in this case may be one having a corresponding compression ratio and of suitable capacity to absorb the energy produced by the expander. A portion of the cooled expanded gas may be recompressed in this compressor to the initial high pressure, then cooled with a second portion of the expanded cooled gas and returned to the expansion engine. The remainder of the cold gas is used as a coolant material for producing reflux to the lower pressure fractionating section of the double tower by effecting heat exchange with the distillate vapors. By return of part of the initially expanded gas to the expansion engine at a lower temperature, the amount of energy removed is increased, producing a final gas of progressively lower temperature until the capacity of the system is attained. In this manner, sharp fractionation can be effected in the lower pressure section of the tower.

In order that the invention may be more fully understood the following description taken together with the accompanying drawings is presented. In the drawings, Figure 1 presents a flow diagram for the overall processing of a hydrocarbon feed stock such as cracked propane producing relatively large quantities of ethylene. In Figure 2, flow diagram for improved processing to obtain more extensive reflux in the low pressure fractionation zone is shown. In this embodiment of the invention a two-stage distillation operation with superimposed zones is described for simplicity of illustration, but clearly the invention is similarly applicable to equipment involving a plurality of stages under diminishing pressures which are physically not superimposed. In the figures, corresponding parts are represented by corresponding numerals.

In Figure 1, feed supply is shown as entering through line 10 and passing through a heat exchanger 12. After passing through the heat exchanger, the hydrocarbon stock is supplied to the lower high pressure section 22 of the double tower unit 20. A typical composition for a hydrocarbon feed from a propane cracking unit is as follows:

| | Gas volume, percent |
|---|---|
| Hydrogen | 10.5 |
| Methane | 30.4 |
| Ethylene | 23.4 |
| Ethane | 9.4 |
| Propylene | 16.0 |
| Propane | 7.0 |
| $C_4+$ | 3.3 |

With such a feed supply, the main product to be obtained is ethylene. The processing in the distillation zone 22 of the double tower 20 is effected under a pressure of 30 atmospheres. At the bottom of the zone 22 is the reboiler 26. In the top of the distillation zone 22 is heat exchanger unit 28. This heat exchanger 28 also forms the bottom of the upper low pressure zone 24.

Under the conditions of processing in the high pressure zone 22, under the pressure of 30 atmospheres, three fractions of compositions

| | Gas, Volume Per Cent | | |
|---|---|---|---|
| | Light Gas Fraction (Line 40) | Light Liquid Fraction (Line 36) | Heavy Fraction (Line 30) |
| Hydrogen | 24.4 | | |
| Methane | 58.1 | 17.2 | |
| Ethylene | 11.6 | 51.0 | 9.4 |
| Ethane | 4.7 | 15.9 | 9.4 |
| Propylene | 1.2 | 12.7 | 44.9 |
| Propane | | 3.2 | 23.4 |
| $C_4+$ | | | 12.9 | are separated with a temperature of −40° F. near the heat exchanger unit 28 and a bottoms temperature of 135° F. From the bottom of the distillation zone 22, the distillation residue is removed through line 30 and passed through cooler 32 and thence through cooler 34 and supplied as feed to the upper distillation zone 24. As a result of the condensing action of the heat exchanger unit 28, liquid condensate is passed through line 36 through condenser 38 and thence through an expansion engine 39 and the thus cooled mixture of liquid and gas admitted near the top of the section 24 as reflux. As vapor overhead product, there is removed through line 40 a gaseous product. This gaseous product is passed through an expansion engine 42. From the expansion engine 42 the cooled product is passed through heat exchanger 38 and thence through line 44 to be subsequently treated as to be further described.

The feed stock to the upper distillation zone 24 is fractionated at a pressure of 21.4 atmospheres as a result of the heating effect of the heat exchanger 28 under the lower pressure conditions prevailing in the zone 24. The distillation residue is removed through line 46 and passed through heat exchanger 32 and thence through line 48 and through heat exchanger 12 as a means for cooling the feed stock supplied to the lower distillation zone 22. The overhead product is removed through line 50. This material is first passed through condenser 52 and thence to the drum 54. The condensate is supplied as reflux to the distillation zone 24 by passage through line 56. The lighter constituents in the drum 54, mainly gaseous, are passed through line 62, united with the gas from the high pressure zone passed through line 44. The combined mixture is then passed through the expansion engine 60 in order to lower the pressure from about 21 to about 2 atmospheres. The cooled product is then passed through line 62 into heat exchange relationship through condenser 52 and thence through line 64, through condenser 34, and thence out through line 66 as vapor product almost at atmospheric pressure.

The composition of the product removed through line 66 is as follows:

| | Gas volume, Percent |
|---|---|
| Hydrogen | 15.4 |
| Methane | 44.8 |
| Ethylene | 29.5 |
| Ethane | 10.2 |
| Propylene | 0.1 |

An improved form of processing for the overhead from zone 24 is shown in Figure 2. In Figure 2 is shown the upper section of a fractionating tower 124. Overhead through line 150 is taken the vapor product and passed through condenser 152. From the condenser 152, the product is passed to a reflux drum 154. The liquid portion is removed through line 156 and supplied as reflux to the distillation zone 124. The vapor is removed from the drum 154 through line 158 and thence to the expansion engine 160. The expansion engine 160 is made to work in conjunction with a compressor 162 so as to absorb the available work obtained from the expander 160. The liquid from the expansion engine 160 is removed through line 164 and passed through condenser 152 and thence through line 168. A portion of the stream is then passed through line 170 and recompressed to the initial pressure. The compressed product is then passed through line 172 and through heat exchanger 174 and into line 176 for mixing with the gas in line 158 from the reflux drum 154 passing to the expansion engine 160. The remainder of the product passing through line 168 is passed through line 178 and thence through the heat exchanger 174 and released as product through line 180.

If further cooling of the overhead from the fractionating zone 124 passing through line 150 is considered necessary, additional condensation may be had by passing the stream through an auxiliary condenser 182 before cooling in the condenser 152. In this additional condenser an external refrigerant may be employed in order to reduce the temperature as particularly desired for desirable processing as previously described after passing through the condenser 152.

By processing as described for the special treatment of the overhead from the low pressure distillation zone, processing with regard to a cracked propane stock of composition as previously given is obtained at lower pressures in the zone 124. Thus, the gaseous stream leaving the reflux drum has been cooled by the use of condenser 152 alone to a temperature of −149° F. and under a pressure of 21.5 atmospheres. The resultant gas passing through line 158, through the expansion engine 160, after passing through the condenser 152, has acquired a temperature of −159° F. under 6.3 atmospheres and a volume expansion of 100%. Portion of this highly cooled product is passed through line 178 and thence through condenser 174 and recovered as product gas at a temperature of −57° F. and a pressure of 6.3 atmospheres. The remaining portion of the cooled stream passing through line 168 is then passed through the compressor 162. Passing through line 172 from this compressor, the product is obtained at −47° F. and a pressure of 21.5 atmospheres. After passing through condenser 174, cooling is obtained at −149° F. and mixture made with the vapor from the reflux drum 154 for subsequent expansion in the engine 160 and thence in the main stream through condenser 152 and finally as product through line 180.

What is claimed is:

1. In a process for fractionating a low molecular weight, normally gaseous, predominantly hydrocarbon mixture containing principally $C_1$–$C_4$ hydrocarbons utilizing at least two diminishing pressure distillation zones, the improvement which comprises the steps of withdrawing at least two liquid fractions of said mixture from the higher pressure distillation zone, one of said fractions being a lighter distillate fraction and the other being a heavier bottoms fraction; passing the bottoms fraction as feed to the lower pressure distillation zone; cooling the lighter fraction and passing it as reflux to the lower pressure distillation zone; taking an overhead vapor stream from the lower pressure distillation zone; cooling and partially condensing the overhead vapor stream; supplying the resulting condensate as additional reflux to the lower pressure distillation zone; expanding the residual uncondensed overhead vapor stream to do work, thereby cooling the expanded vapor stream; utilizing the thus cooled expanded vapor to cool the overhead vapor stream from the lower pressure distillation zone; taking a recycle portion of the expanded vapor stream through a compression zone wherein work made available by the expansion step is utilized to compress the expanded vapor; cooling the thus compressed vapor stream; returning this thus compressed vapor stream as recycle to the expansion step and withdrawing the residual portion of the expanded vapor stream as product.

2. A process as in claim 1 in which the vapor product stream is utilized to cool the compressed vapor recycle stream being sent to the expansion step.

JOHN A. PATTERSON.

REFERENCES CITED

The following references are of record in the file of this patent:

UNITED STATES PATENTS

| Number | Name | Date |
|---|---|---|
| 1,880,981 | Pollitzer et al. | Oct. 4, 1932 |
| 1,970,299 | Frankl | Aug. 14, 1934 |
| 2,078,953 | Levin | May 4, 1937 |

FOREIGN PATENTS

| Number | Country | Date |
|---|---|---|
| 378,769 | Great Britain | Aug. 18, 1932 |

OTHER REFERENCES

Principles of Engineering Thermodynamics, by Kiefer and Stewart, page 492.